United States Patent
Yamamoto

(10) Patent No.: US 10,019,636 B2
(45) Date of Patent: Jul. 10, 2018

(54) OBJECT DETECTION APPARATUS

(71) Applicant: FUJITSU TEN LIMITED, Kobe-shi, Hyogo (JP)

(72) Inventor: Tetsuo Yamamoto, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 122 days.

(21) Appl. No.: 15/195,653

(22) Filed: Jun. 28, 2016

(65) Prior Publication Data

US 2017/0053173 A1 Feb. 23, 2017

(30) Foreign Application Priority Data

Aug. 20, 2015 (JP) ................................ 2015-162369

(51) Int. Cl.
*G06K 9/00* (2006.01)
*G06T 7/215* (2017.01)
*B60R 1/00* (2006.01)
*G06T 7/246* (2017.01)

(52) U.S. Cl.
CPC ............ *G06K 9/00805* (2013.01); *B60R 1/00* (2013.01); *G06T 7/215* (2017.01); *G06T 7/246* (2017.01); *B60R 2300/105* (2013.01); *B60R 2300/30* (2013.01); *B60R 2300/8093* (2013.01); *G06T 2207/30261* (2013.01)

(58) Field of Classification Search
CPC ..... G06K 9/00805; G06T 7/215; G06T 7/246; G06T 2207/30261; B60R 1/00; B60R 2300/105; B60R 2300/30; B60R 2300/8093

See application file for complete search history.

(56) References Cited

U.S. PATENT DOCUMENTS

| | | | |
|---|---|---|---|
| 9,230,501 B1* | 1/2016 | Starner | G09G 5/00 |
| 9,789,820 B2* | 10/2017 | Yamamoto | B60R 1/00 |
| 2010/0034457 A1* | 2/2010 | Berliner | G06K 9/00362 |
| | | | 382/154 |

(Continued)

FOREIGN PATENT DOCUMENTS

JP 2014-146083 A 8/2014

OTHER PUBLICATIONS

Choi et al. "Event classification for vehicle navigation system by regional optical flow analysis." Machine vision and applications 25.3 (2011): 547-559.*

(Continued)

*Primary Examiner* — Katrina Fujita
(74) *Attorney, Agent, or Firm* — Oliff PLC

(57) ABSTRACT

An object detection apparatus includes: an image processing circuit configured to: (i) derive optical flows based on feature points of captured images periodically captured by a camera that captures images of the surroundings of the vehicle; (ii) group the feature points relating to the optical flows based on positions of the feature points to derive one or more groups; and (iii) detect the object based on a size of each of the one or more groups; and a microcomputer that communicates with the image processing circuit and is configured to: (a) obtain a speed of the vehicle; and (b) set a parameter that affects the size of the one or more groups such that as the speed of the vehicle is slower, the size of the one or more groups is greater.

14 Claims, 13 Drawing Sheets

(56) References Cited

U.S. PATENT DOCUMENTS

| | | | | |
|---|---|---|---|---|
| 2010/0260377 A1* | 10/2010 | Takahashi | .......... | G06K 9/00805 |
| | | | | 382/103 |
| 2012/0027258 A1* | 2/2012 | Uchida | .............. | G06K 9/00805 |
| | | | | 382/103 |
| 2012/0140072 A1* | 6/2012 | Murashita | .......... | G06K 9/00805 |
| | | | | 348/148 |
| 2013/0215270 A1* | 8/2013 | Murashita | ................. | B60R 1/00 |
| | | | | 348/148 |
| 2014/0211007 A1* | 7/2014 | Yamamoto | ......... | G06K 9/00791 |
| | | | | 348/148 |
| 2014/0214276 A1* | 7/2014 | Yamamoto | ................ | B60R 1/00 |
| | | | | 701/41 |

OTHER PUBLICATIONS

Lan et al. "Vehicle speed measurement based on gray constraint optical flow algorithm." Optik-International Journal for Light and Electron Optics 125.1 (Jan. 2014): 289-295.*

Miyazaki et al. "Offset Vertical Stereo System for Real-Time Range-Finding to Preceding Vehicles." MVA 98 (1998): 459-462.*

Nguyen et al. "Compensating background for noise due to camera vibration in uncalibrated-camera-based vehicle speed measurement system." IEEE Transactions on Vehicular Technology 60.1 (2011): 30-43.*

Shimizu et al. "Multi angle vision system to supplement driver's visual field." Fujitsu Ten Tech. J. 36 (2011): 12-18.*

Yamamoto et al. "Support System to inform Driver of Approaching Objects." Fujitsu Ten Technical Journal 39 (2013): 3.*

* cited by examiner

OBJECT DETECTION APPARATUS

BACKGROUND OF THE INVENTION

Field of the Invention

The invention relates to a technology for detecting an object in a vicinity of a vehicle.

Description of the Background Art

Conventionally, an object detection apparatus has been proposed that detects an object by using captured images captured by a camera for capturing images of a vicinity of a vehicle. The object detection apparatus detects an object based on captured images captured by, for example, a front camera. Since a user (mainly a driver) is informed of a detection result detected by such an object detection apparatus, the user can easily understand an object, for example, a vehicle approaching from a blind area in a traffic intersection or in a parking lot with poor visibility.

Optical flow method is well known as a detection method used for such an object detection apparatus to detect an object. The optical flow method extracts feature points from the captured images (frame) periodically obtained to derive optical flows that serve as vectors indicative of movement of feature points between the captured images. Based on the optical flows, the object detection apparatus detects an object in a vicinity of a host vehicle.

In a case where the optical flow method is used, while the host vehicle is travelling, in addition to the optical flows of a moving object, optical flows of a background are derived. Such an optical flow of the background causes a false detection of an object.

A detection sensitivity of the conventional object detection apparatus is fixed at a predetermined level to avoid such false detection of an object. Therefore, it is difficult to improve object detection performance of the object detection apparatus.

SUMMARY OF THE INVENTION

According to one aspect of the invention, an object detection apparatus that detects an object in surroundings of a vehicle, includes: an image processing circuit configured to: (i) derive optical flows based on feature points of captured images periodically captured by a camera that captures images of the surroundings of the vehicle; (ii) group the feature points relating to the optical flows based on positions of the feature points to derive one or more groups; and (iii) detect the object based on a size of each of the one or more groups; and a microcomputer that communicates with the image processing circuit and is configured to: (a) obtain a speed of the vehicle; and (b) set a parameter that affects the size of the one or more groups such that as the speed of the vehicle is slower, the size of the one or more groups is greater.

The parameter that affects the size of the one or more groups is set such that as the speed of the vehicle is lower, the size of the group is greater. Therefore; it is possible to improve object detection performance by increasing object detection sensitivity as the speed of the vehicle is lower.

According to another aspect of the invention, the microcomputer is configured to: determine, based on the speed of the vehicle, whether the vehicle is stopped or is travelling, and set the parameter that affects the size of the one or more groups such that the size of the one or more groups is greater in a case where the vehicle is stopped, as compared to a case where the vehicle is travelling.

The parameter that affects the size of the one or more groups is set such that the size of the group is greater in the case where the vehicle is stopped as compared to the case where the host vehicle is travelling. Therefore, it is possible to improve the object detection performance by increasing the object detection sensitivity in the case where the vehicle is stopped. In the case where the vehicle is travelling, the object detection sensitivity is decreased to prevent false detection of an object.

Therefore, an object of this invention is to improve object detection performance.

These and other objects, features, aspects and advantages of the invention will become more apparent from the following detailed description of the invention when taken in conjunction with the accompanying drawings.

DESCRIPTION OF THE EMBODIMENTS

An embodiment of the invention will be described below with reference to the drawings.

1. SYSTEM CONFIGURATION

Figure 1:
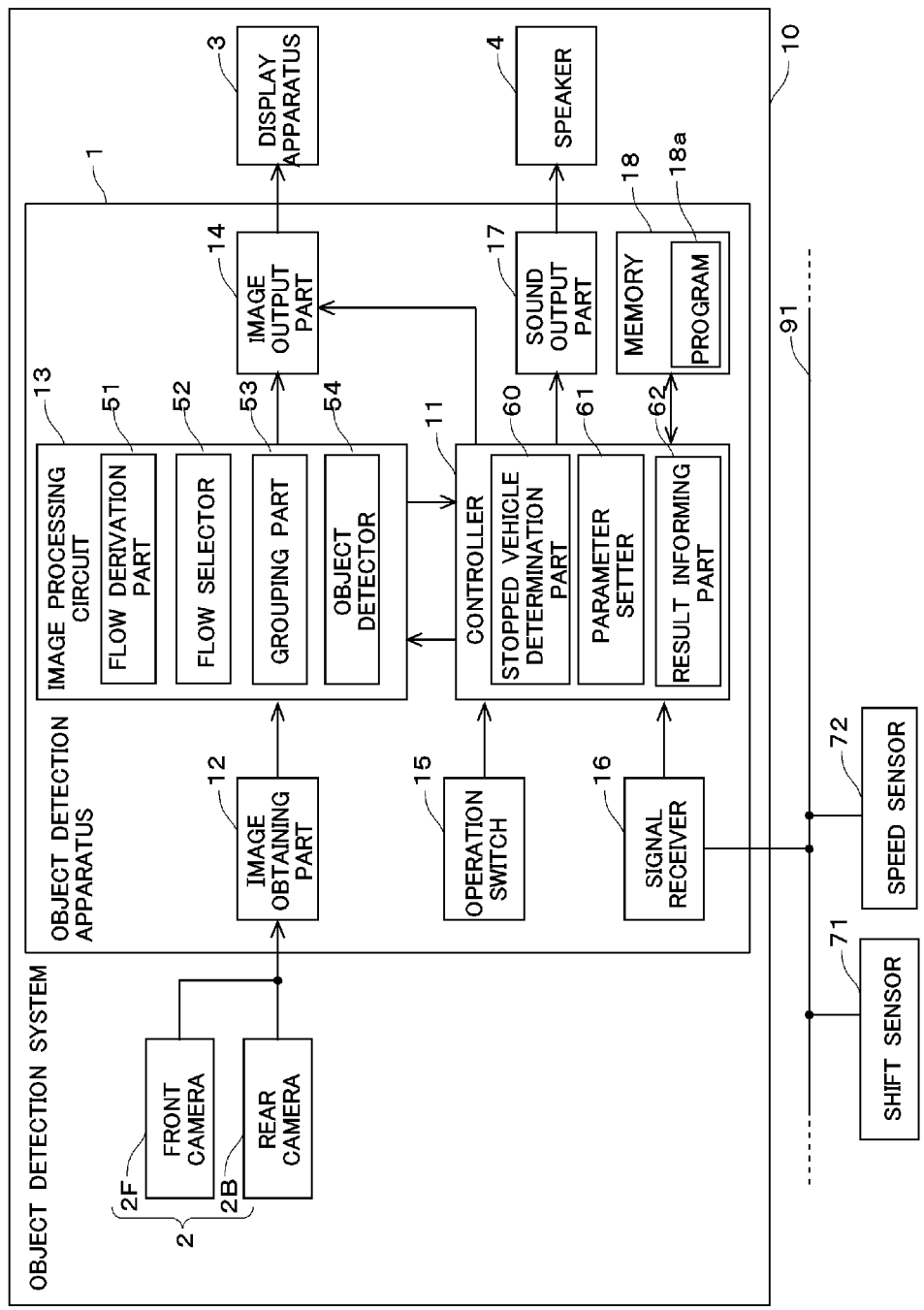
FIG. 1 illustrates a schematic configuration of an object detection system.

FIG. 1 illustrates a schematic configuration of an object detection system 10 of this embodiment. The object detection system 10 is used in a vehicle, such as a car. The object detection system 10 has a function of detecting an object moving in a vicinity of a vehicle and a function of informing a user of a detection result in a case where the object detection system 10 detected the moving object. The vehicle on which the object detection system 10 is used is hereinafter referred to as "host vehicle."

The object detection system 10 includes a display apparatus 3 that displays a captured image and a speaker 4 that outputs sounds. The display apparatus 3 is provided in a position in which the user (mainly a driver) can see the display apparatus 3 in a cabin of the host vehicle, and informs the user of various types of information. The display apparatus 3 may include a navigation function that provides a route guidance leading to a destination and other functions in addition to a basic display function. The speaker 4 is provided in the cabin of the host vehicle, and informs the user of information by sounds.

Moreover, the object detection system 10 includes a plurality of cameras 2 that obtain the captured images by capturing images of the vicinity of the host vehicle. Each of the plurality of cameras 2 includes a lens, an image sensor and an image processor, and electronically obtains the captured images and then performs predetermined image processing of the obtained captured images. Each of the plurality of cameras 2 obtains the captured image in a predetermined time cycle (e.g., 1/30 sec. cycle).

Figure 2:
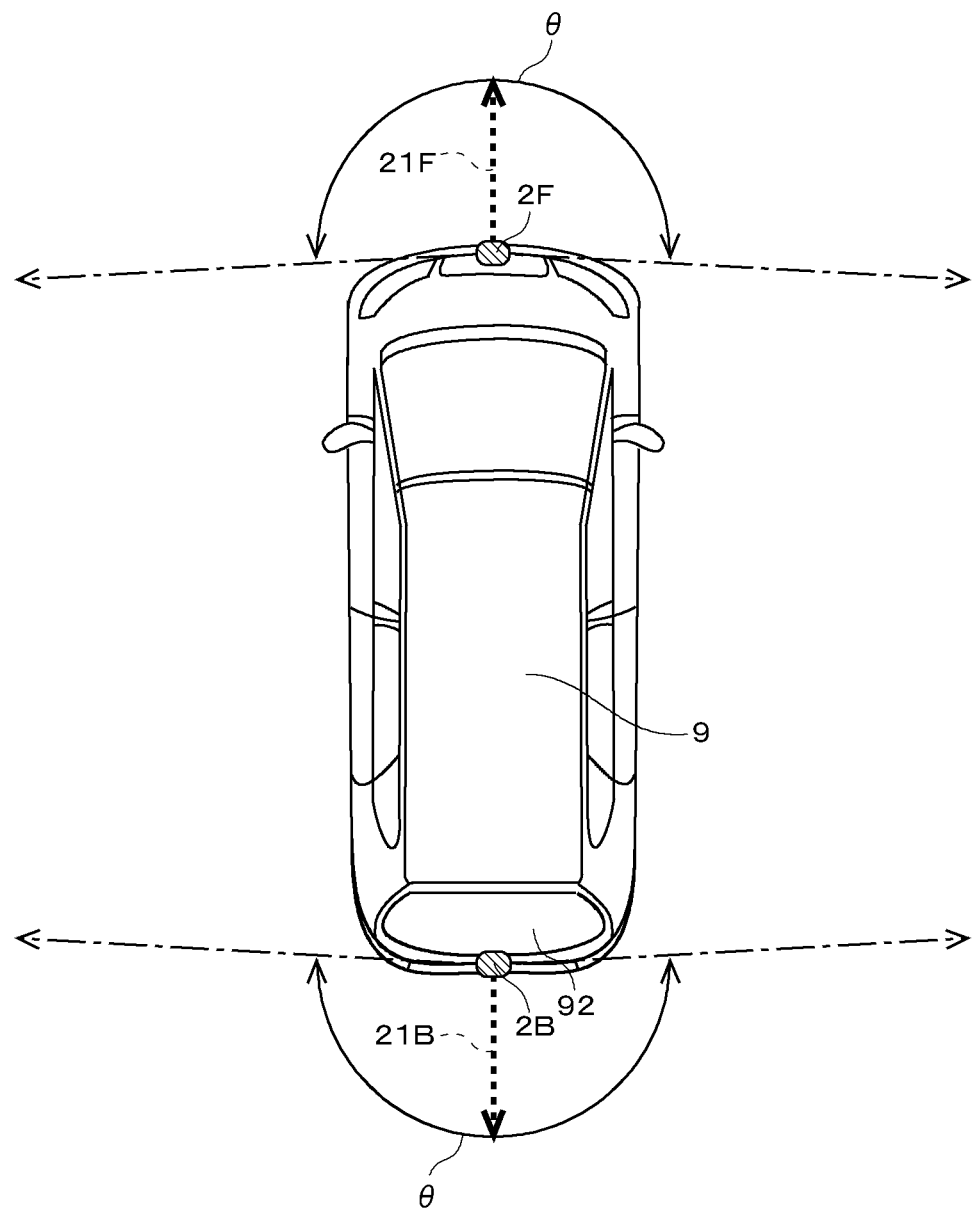
FIG. 2 illustrates directions in which the two cameras capture images.

The plurality of cameras 2 include a front camera 2F and a rear camera 2B. FIG. 2 illustrates directions in which the two cameras 2F and 2B capture the images.

As shown in FIG. 2, the front camera 2F is provided on a bumper that is a front end of a host vehicle 9, having an optical axis 21F directed forward in a front-back direction of the host vehicle 9. Therefore, the front camera 2F captures images of an area in front of the host vehicle 9 and obtains the captured images showing a situation in the area in front of the host vehicle 9. Moreover, the rear camera 2B is provided on a tailgate 92 that is a rear end of the host vehicle 9, having an optical axis 21B directed backward in the front-back direction of the host vehicle 9. Therefore, the rear camera 2B captures images of an area behind the host vehicle 9 and obtains the captured images showing a situation in the area behind the host vehicle 9.

A fish lens is used for a lens of each of those cameras 2 and each camera 2 has an angle of view θ of 180 degrees or more. Thus, the front camera 2F is configured to capture images of a region extending in a horizontal direction at 180 degrees or more in front of the host vehicle 9. The rear camera 2B is configured to capture images of a region extending in the horizontal direction at 180 degrees or more behind the host vehicle 9.

The object detection system 10 causes the captured image obtained by one of the plurality of cameras 2, to be displayed on the display apparatus 3. The one camera is selected from amongst the plurality of cameras 2, according to an operation mode. In a front mode, the object detection system 10 causes the captured image obtained by the front camera 2F to be displayed. In a back mode, the object detection system 10 causes the captured image obtained by the rear camera 2B to be displayed. Such an operation mode is switched based on, for example, a travelling direction of the host vehicle 9. Thus, the user can understand a situation of the vicinity of the host vehicle 9 in the travelling direction, on a real-time basis.

Moreover, the object detection system 10 detects an object approaching the host vehicle 9 based on the captured images obtained by one of the plurality of cameras 2, selected according to the operation mode. Then, in a case where the object detection system 10 detected an object, the object detection system 10 informs the user of the detection result via the display apparatus 3 and the speaker 4. Thus, the user can easily understand the object approaching from a blind area in a traffic intersection or a parking lot with poor visibility.

Figure 3:
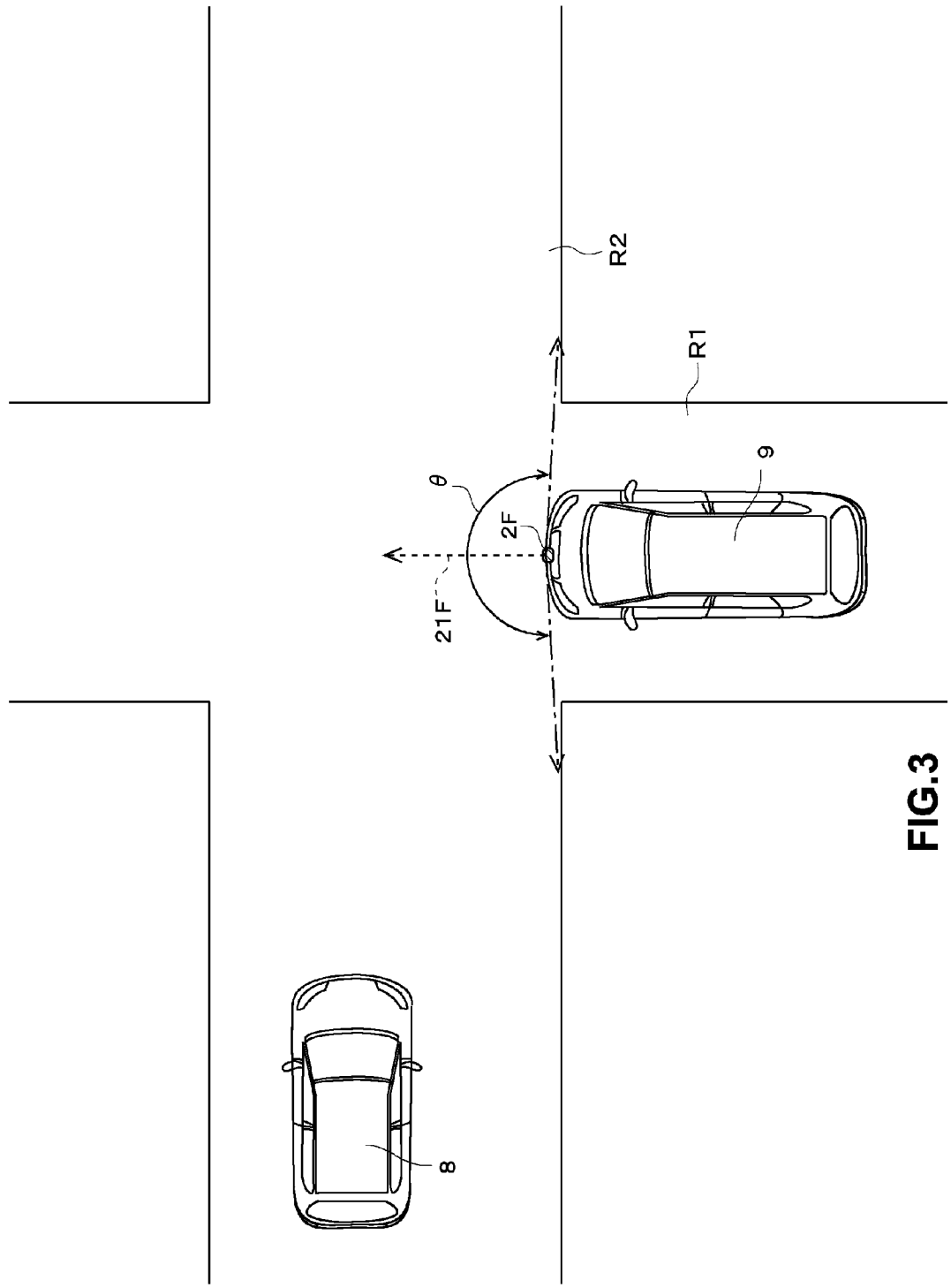
FIG. 3 illustrates an example of a case where the object detection system is used.

FIG. 3 illustrates an example of a case where the object detection system 10 is used. FIG. 3 illustrates the host vehicle 9 entering a traffic intersection with poor visibility. The object detection system 10 is in the front mode. As described above, the front camera 2F has the angle of view θ of 180 degrees or more. Therefore, as shown in FIG. 3, in a state where only the front end of the host vehicle 9 is entering the traffic intersection, the front camera 2F captures images of an area extending in the horizontal direction of the traffic intersection. Therefore, the object detection system 10 obtains the captured images showing a situation on a different road R2 substantially orthogonal to a road R1 on which the host vehicle 9 is travelling, and causes the obtained captured images to be displayed on the display apparatus 3.

Moreover, the captured image obtained as described above includes an image of an object (a different vehicle 8, a pedestrian, etc.) moving on the different road R2 and approaching the host vehicle 9 from a left side or from a right side of the host vehicle 9. The object detection system 10 detects the object approaching the host vehicle 9 by using the captured images and then informs the user of the detection result. Thus, the user can easily understand the object approaching the host vehicle 9 before the host vehicle 9 entirely enters the traffic intersection.

With reference back to FIG. 1, the object detection system 10 includes an object detection apparatus 1 that detects an object approaching the host vehicle 9 based on the captured images obtained by at least one of the plurality of cameras 2. The object detection apparatus 1 may be a vehicle-mounted apparatus that is mounted on the host vehicle 9, or may be a mobile apparatus, such as a smartphone, that the user brings into the host vehicle 9. The object detection apparatus 1 includes an image obtaining part 12, an image processing circuit 13 and an image output part 14.

The image obtaining part 12 obtains the captured images obtained by one of the plurality of cameras 2 according to the operation mode. The image obtaining part 12 periodically obtains the captured image from the one of the plurality of cameras 2 in a predetermined time cycle (e.g., 1/30 sec. cycle). One captured image obtained by the image obtaining part 12 serves as one frame of an image signal.

The image processing circuit 13 is a hardware circuit, such as an ASIC and an FPGA, that performs a predetermine image processing of the captured images obtained by the image obtaining part 12. The image processing circuit 13 performs an object detection process for detecting an object by an optical flow method. A flow derivation part 51, a flow selector 52, a grouping part 53 and an object detector 54 shown in FIG. 1 are functions for the object detection process.

The flow derivation part 51 derives optical flows based on feature points of the captured image periodically obtained by a camera. The flow selector 52 selects optical flows pointing in a predetermined direction as a process target, from amongst the optical flows derived by the flow derivation part 51.

Figure 4:
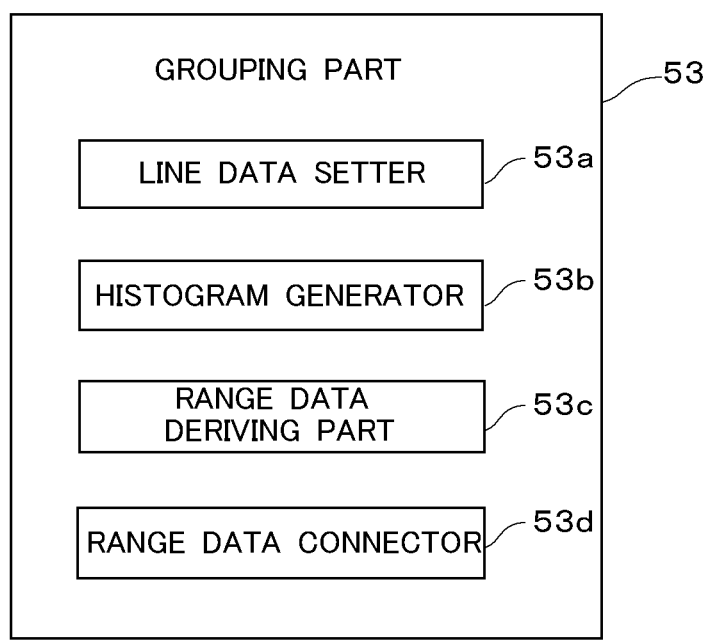
FIG. 4 illustrates a block diagram showing functions included in a grouping part.

The grouping part 53 derives one or more groups of the feature points relating to the selected optical flows pointing in the predetermined direction, based on positions of the feature points, and then derives the one or more groups (hereinafter referred to simply as "the group") of the feature points. FIG. 4 illustrates a block diagram showing functions included in the grouping part 53. The grouping part 53 includes a line data setter 53a, a histogram generator 53b, a range data deriving part 53c and a range data connector 53d, as the functions. Details of those functions will be described later.

With reference back to FIG. 1, the object detector 54 detects an object based on a size of the group derived by the grouping part 53. In a case where the object detector 54 detected an object, the image processing circuit 13 outputs the detection result of the object detection process.

The image output part 14 generates a display image including various types of information and the captured image. The image output part 14 converts the generated display image into the image signal in a predetermined format, such as the NTSC standard, and then outputs the image signal to the display apparatus 3. Thus, the display image including the captured image is displayed on the display apparatus 3.

Moreover, the object detection apparatus 1 includes an operation switch 15, a signal receiver 16, a sound output part 17, a memory 18 and a controller 11.

The operation switch 15 is provided in the cabin of the host vehicle 9. The operation switch 15 receives an operation made by the user and then inputs a signal indicative of a content of the operation to the controller 11.

The signal receiver 16 receives a signal from another apparatus via an in-vehicle network 91 provided in the host vehicle 9 to obtain a vehicle state of the host vehicle 9. The signal receiver 16 inputs the received signal to the controller 11.

The signal receiver 16 receives signals sent from a shift sensor 71 and a speed sensor 72. The shift sensor 71 detects a shift position that is a position of a gearshift of a transmission of the host vehicle 9, and then sends a signal indicative of the shift position. The shift position shows the travelling direction of the host vehicle 9. The speed sensor 72 detects a speed of the host vehicle 9 based on rotations of a wheel shaft of the host vehicle 9, and then sends a signal indicative of the speed of the host vehicle 9. Thus, the signal receiver 16 obtains the shift position and the speed of the host vehicle 9 as the vehicle state of the host vehicle 9.

The sound output part 17 generates an audio signal based on a signal from the controller 11, and then outputs the generated audio signal to the speaker 4. Thus, a sound, such as alarm, is issued from the speaker 4.

The memory 18 is, for example, a non-volatile memory such as a flash memory and stores various types of information. The memory 18 stores, for example, a program 18a as firmware.

The controller 11 is a microcomputer including a CPU, a RAM, a ROM, etc., and controls each part of the object detection apparatus 1 including the image processing circuit 13. The controller 11, for example, changes the operation mode of the object detection system 10, depending on the position of the gearshift obtained by the signal receiver 16 and the content of an operation with the operation switch 15.

Each function of the controller 11 is realized by software. In other words, the functions of the controller 11 are realized by executing the program 18a (arithmetic processing by the CPU based on the program 18a) stored in the memory 18. A stopped vehicle determination part 60, a parameter setter 61 and a result informing part 62 shown in FIG. 1 are a part of functions realized by executing the program 18a.

The stopped vehicle determination part 60 determines, based on the speed of the host vehicle 9 obtained by the signal receiver 16, whether the host vehicle 9 is stopped or is travelling.

The parameter setter 61 sets a predetermined parameter to adjust object detection sensitivity of the object detection apparatus 1. The parameter setter 61 sets the parameter based on a result of a determination made by the stopped vehicle determination part 60. The parameter setter 61 sets the parameter used by the grouping part 53 to group the feature points. Details of the parameter set by the parameter setter 61 will be described later.

The result informing part 62 informs the user of the detection result of the object detection process performed by the image processing circuit 13. The result informing part 62 receives the detection result output from the image processing circuit 13, and then sends a signal to the image output part 14 to cause the image output part 14 to generate the display image showing the detection result. Thus, the display image showing the detection result is displayed on the display apparatus 3. Moreover, the result informing part 62 sends a signal to the sound output part 17 to cause the sound output part 17 to generate the audio signal corresponding to the detection result. Thus, a warning corresponding to the detection result is issued from the speaker 4.

Figure 5:
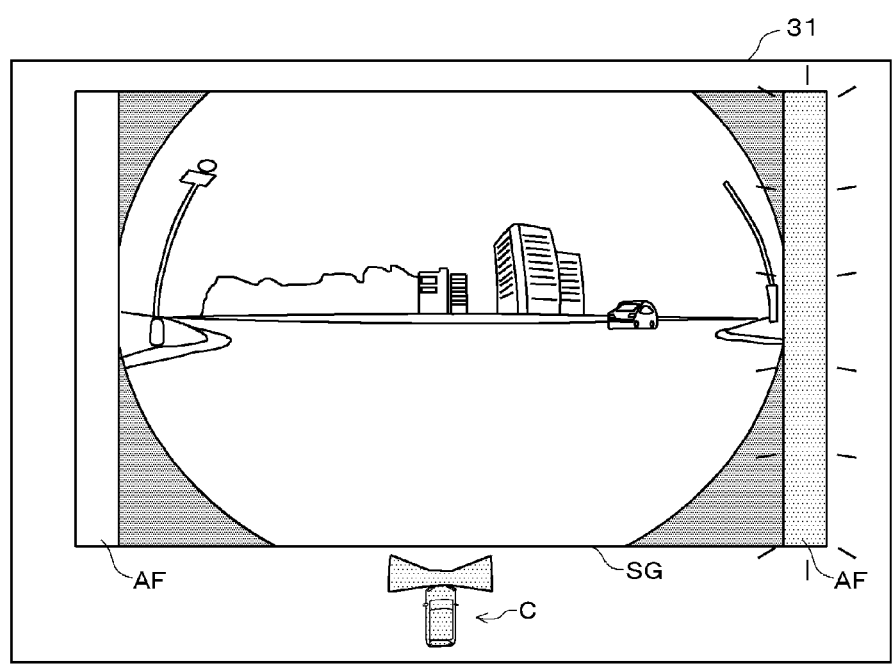
FIG. 5 illustrates an example of a display image.

FIG. 5 illustrates an example of a display image 31 displayed on the display apparatus 3 in the front mode. The display image 31 includes a captured image SG obtained by one of the plurality of cameras 2, two warning portions AF that serve as indicators showing the detection result of the object detection process, and an icon C indicative of the operation mode.

The two warning portions AF are rectangle regions extending vertically and are provided on a left side and a right side of the captured image SG, respectively. In a case where an object approaches from the right side of the host vehicle 9, the warning portion AF on the right side blinks in a predetermined color (e.g., yellow), as shown in FIG. 5. In a case where an object approaches from a left side of the host vehicle 9, the warning portion AF on the left side blinks in a predetermined color.

Moreover, in the case where the object approaches the host vehicle 9 as described above, a predetermined warning sound is issued from the speaker 4. Thus, the user can easily understand a direction in which an object approaches the host vehicle 9 as well as presence of the object.

2. OBJECT DETECTION PROCESS

Next described will be the object detection process performed by the image processing circuit 13. As described above, the image processing circuit 13 detects an object by performing the object detection process using the optical flow method that is one of frame correlation methods, using a plurality of the captured images (frames) periodically obtained.

Figure 6:
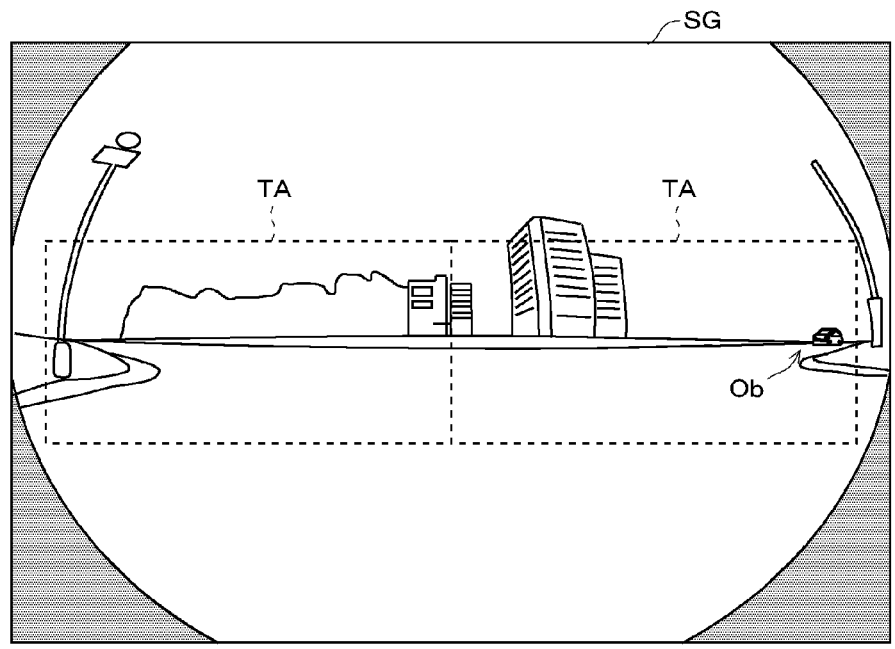
FIG. 6 shows an example of a captured image obtained by a front camera.
Figure 7:
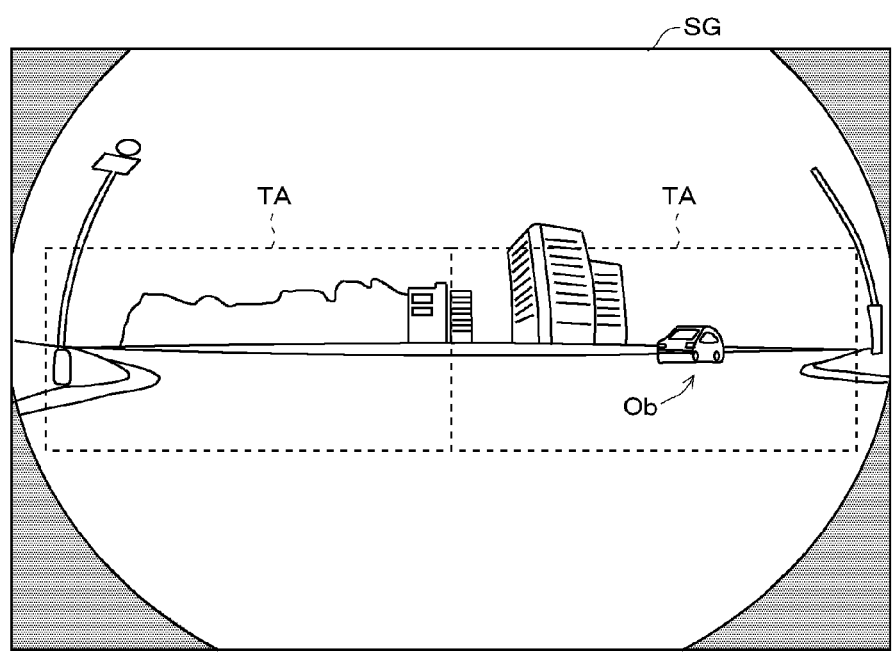
FIG. 7 shows an example of a captured image obtained by the front camera.
Figure 8:
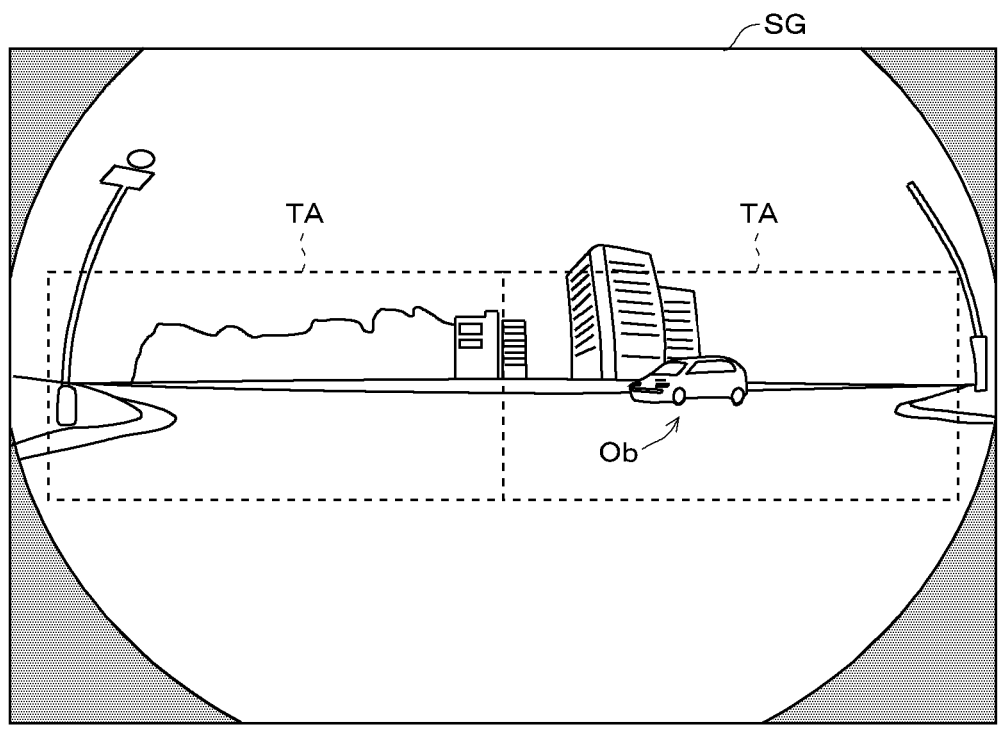
FIG. 8 shows an example of a captured image obtained by the front camera.

FIG. 6, FIG. 7 and FIG. 8 show an example of a plurality of the captured images SG (frames) temporally sequentially obtained by the front camera 2F. FIG. 6 shows an oldest captured image SG and FIG. 8 shows a latest captured image SG. Each of the captured images SG in FIGS. 6-8 includes an object image Ob approaching the host vehicle 9. The image processing circuit 13 performs the object detection process by the optical flow method using the periodically obtained plurality of the captured images SG to detect the object approaching the host vehicle 9.

The image processing circuit 13 performs the object detection process of each of two detection regions TA that are a left detection region and a right detection region set on the captured image SG. The two detection regions TA are set near a vertically center area of the captured image SG. Then, one of the two detection regions TA is set to a left portion of the captured image SG and the other is set to a right portion of the captured image SG. It is recommended that these detection regions TA should include a varnishing point (a point at which images of two lines that are actually parallel intersect in perspective) that is a theoretical point at infinity.

Figure 9:
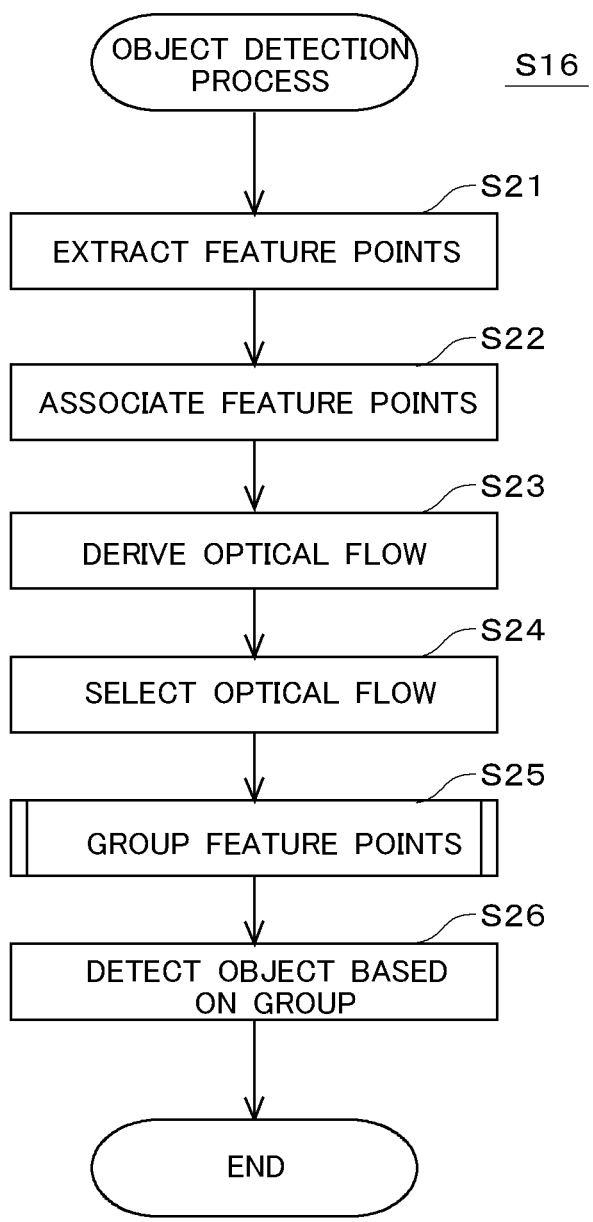
FIG. 9 illustrates a flow of an object detection process by an optical flow method.
Figure 10:
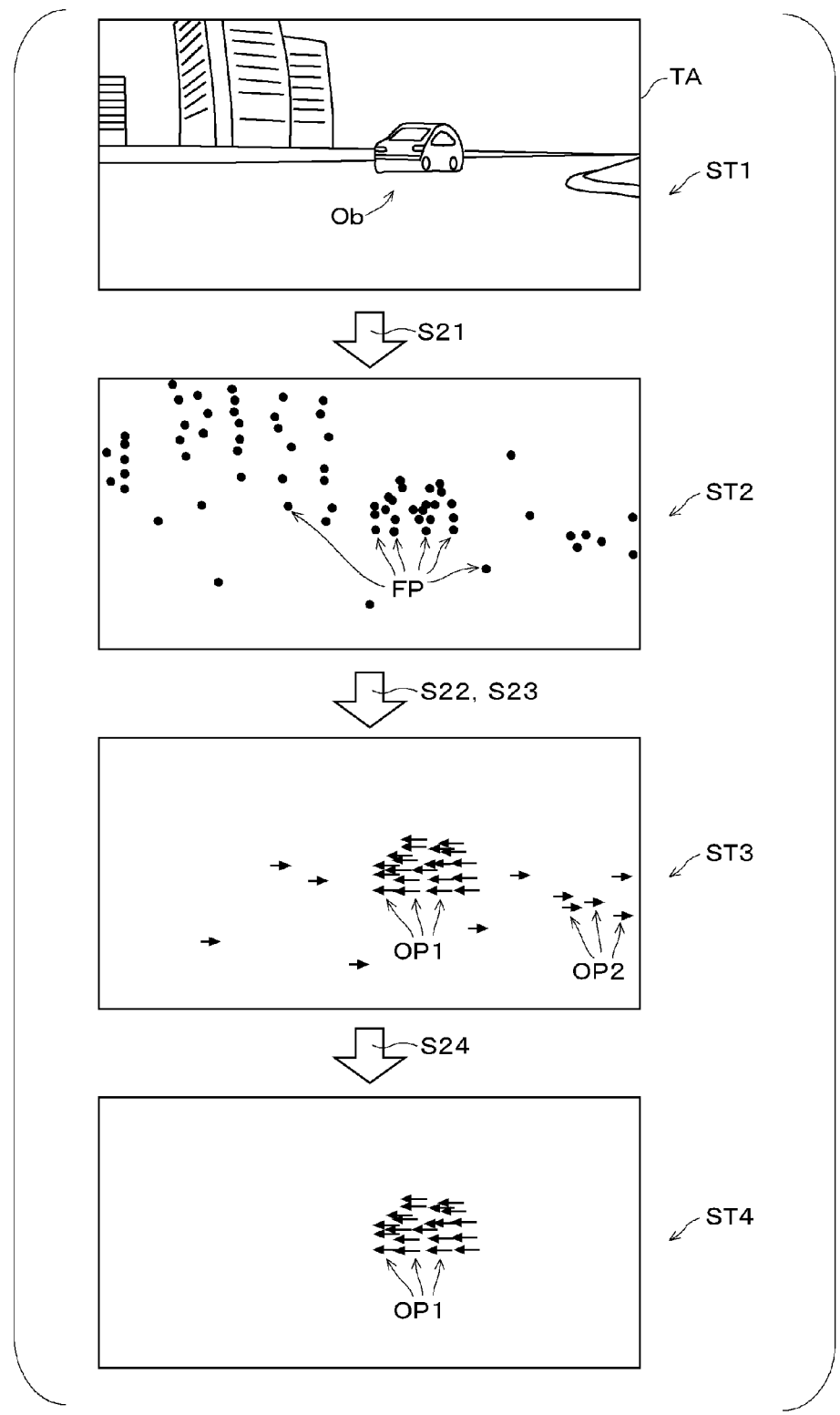
FIG. 10 illustrates a shift of a state of a detection region in an object detection process.

FIG. 9 illustrates a flow of the object detection process by the optical flow method. The object detection process is performed for each of the two left and right detection regions TA on the captured image. FIG. 10 illustrates a shift of a state of the right detection region TA on the captured image SG. A state ST1 is a state before the object detection process. With reference to FIG. 9 and FIG. 10, the object detection process by the optical flow method will be described below.

The object detection process is performed for each of the captured images (frames) periodically obtained by one of the plurality of cameras 2. At a start point of the object detection process, one captured image to be processed in a current object detection process was already obtained. In this explanation, the one captured image (the captured image obtained most recently) to be processed in the current object detection process is referred to as "current frame," and a captured image that was processed in a previous object detection process (captured image that is one frame before the current captured image) is referred to as "previous frame."

First, the flow derivation part 51 extracts feature points FP in the detection region TA on the current frame (a step S21). The feature points FP are detectable points that are distinct points, such as intersection points of edges, on the captured image. The flow derivation part 51 extracts the feature points FP of the current frame, using a well-known method, such as the Harris operator. The flow derivation part 51 extracts not only the feature points FP of a moving object but also to the feature points FP of a subject serving as a background (hereinafter referred to simply as "background") on the captured image (a state ST2 in FIG. 10).

Next, the flow derivation part 51 associates the feature points of two temporally sequentially captured images (a step S22). The flow derivation part 51 associates the feature points FP extracted from the current frame in the current object detection process with feature points extracted from the previous frame in the previous object detection process. Feature points of a moving object appear at different positions when two temporally sequential captured images (frames) are compared. Therefore, the flow derivation part 51 associates the feature points of a same portion of a same object on the two captured images.

Data relating to the feature points of the previous frame is stored in a memory of the image processing circuit 13. The flow derivation part 51 attempts to associate the feature points of the previous frame with the feature points FP of the current frame. The flow derivation part 51 compares, for example, a relatively small block (e.g., 3 dots in a horizontal direction×3 dots in a vertical direction) having a feature point in a center of the block of the previous frame with a block having the feature point FP in a center of the block of the current frame, in a same size as the block on the previous frame. Then, the flow derivation part 51 associates or pairs the feature points, having pixel values proximate to each other, in the blocks on the previous frame and the current frame.

Next, the flow derivation part 51 derives an optical flow that is a vector showing the movement of the feature point based on each pair of the associated feature points (a step S23). The flow derivation part 51 derives, as the optical flow, the vector showing movement of a feature point from a position thereof on the previous frame to a position thereof on the current position. Optical flows derived by the flow derivation part 51 include a left-pointing optical flow OP1 and a right-pointing optical flow OP2 (a state ST3 in FIG. 10).

Next, the flow selector 52 selects an optical flow pointing in a predetermined direction from amongst the optical flows derived by the flow derivation part 51 (a step S24). Normally, the object image Ob of the object approaching the host vehicle 9 moves inward on the captured image SG (from a left end portion or a right end portion of the captured image SG to a center portion of the captured image SG). Therefore, the flow selector 52 maintains only the optical flows pointing in an inward direction to be processed as the process target, amongst the optical flows derived by the flow derivation part 51, because the inward direction is the predetermine direction, and excludes optical flows pointing in an outward direction from the process targets.

The flow selector 52 maintains the optical flows pointing in the left direction in the right detection regions TA on the captured image SG as the process targets and maintains the optical flows pointing in the right direction in the left detection regions TA on the captured image SG. In the detection regions TA shown as an example in FIG. 10, the flow selector 52 selects only the left-pointing optical flows OP1 as the process targets (a state ST4).

Next, the grouping part 53 groups feature points (feature points of the current frame) of the selected optical flows based on positions of the feature points to derive a group of the feature points (a step S25). The grouping part 53 groups a plurality of the feature points existing close to each other, as one group, from amongst the feature points relating to the optical flows. Details of this process of grouping will be described later.

Next, the object detector 54 detects an object based on a size of the group derived by the grouping part 53. The object detector 54 compares the size of the group derived by the grouping part 53 with a predetermined reference size (e.g., 15 dots in the horizontal direction×16 dots in the vertical direction). Then, the object detector 54 detects a group in a size greater than the reference size, as an object (a step S26).

3. GROUPING

Figure 11:
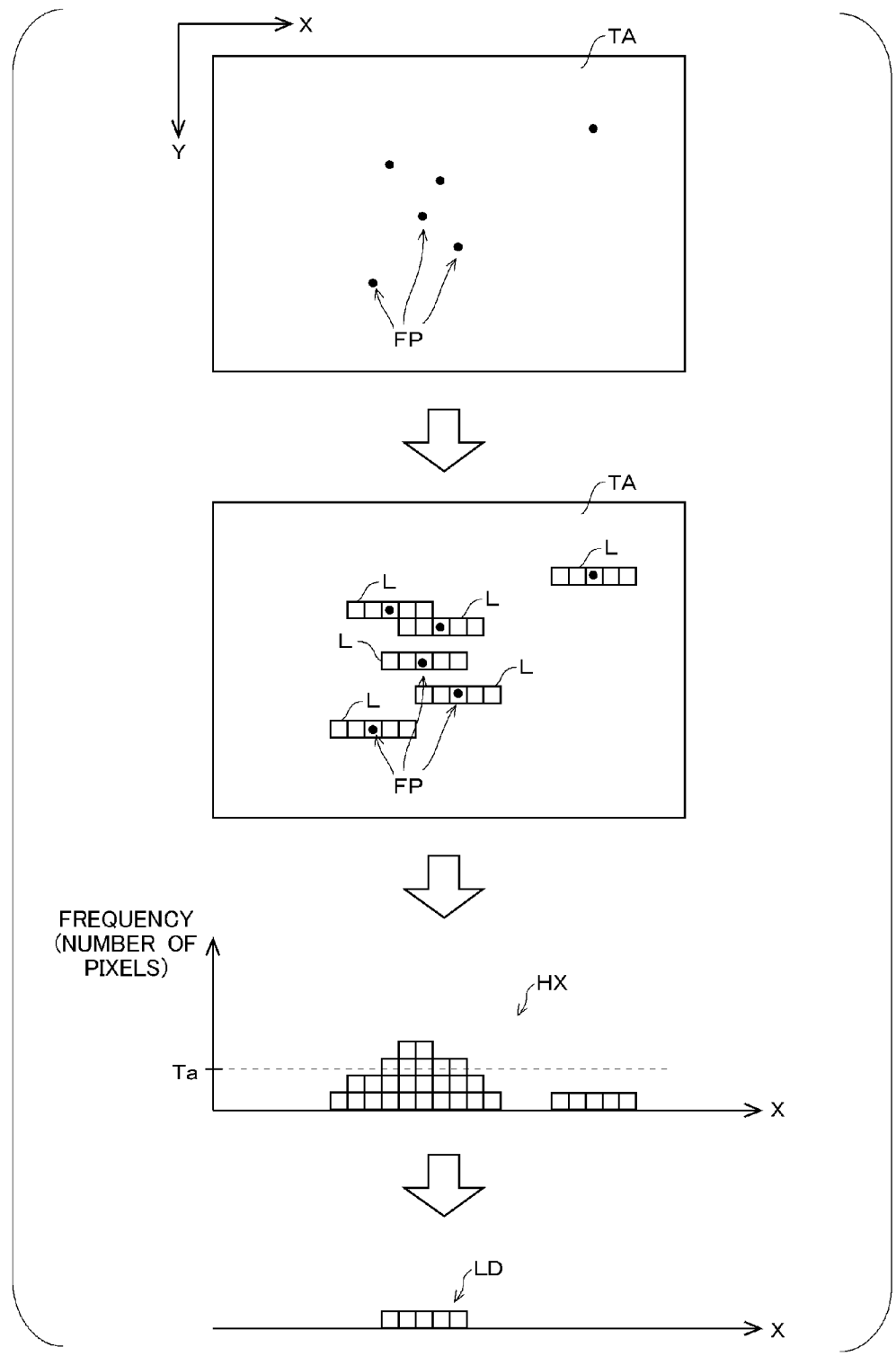
FIG. 11 illustrates a method for grouping feature points.
Figure 12:
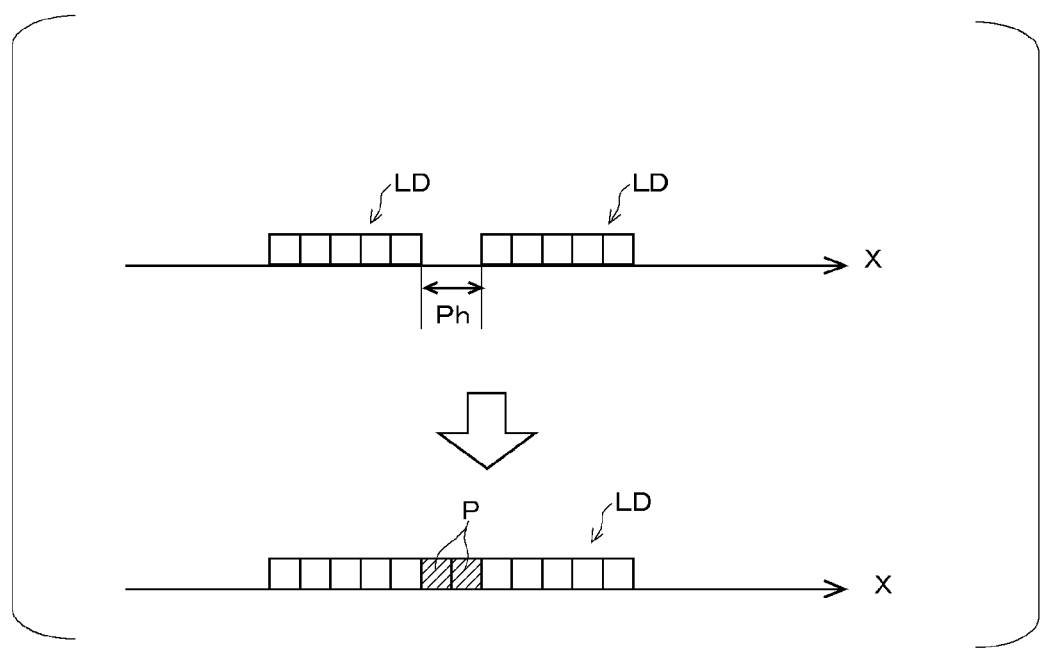
FIG. 12 illustrates the method for grouping the feature points.
Figure 13:
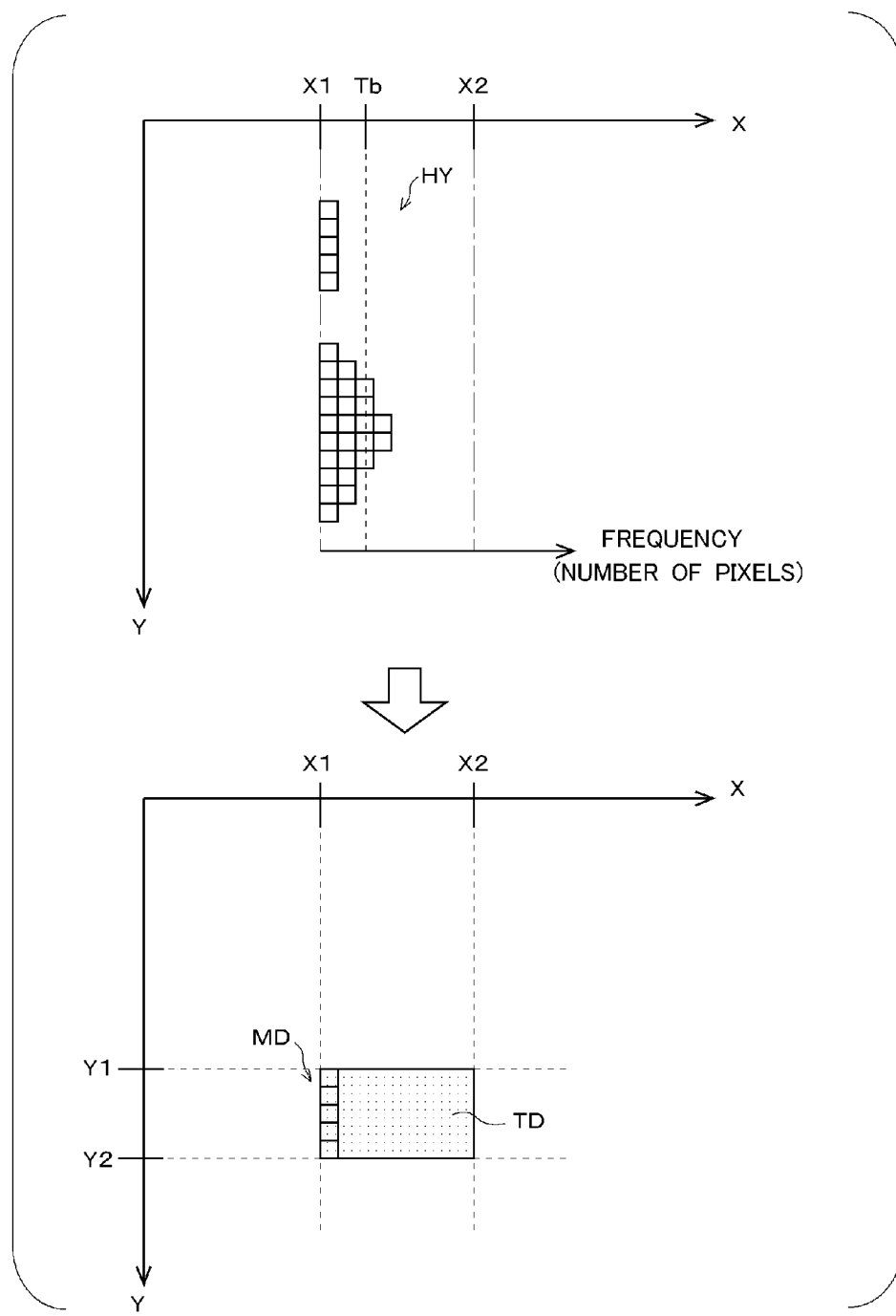
FIG. 13 illustrates the method for grouping the feature points.

Next described in more detail will be a process performed by the grouping part 53 to group the feature points FP and then to derive a group of the feature points FP (the step S25 in FIG. 9). FIG. 11, FIG. 12 and FIG. 13 illustrate a method for grouping the feature points FP. FIG. 11 illustrates an enlarged portion of the detection regions TA. Moreover, in this description, an X-axis represents a horizontal direction (a right side is a positive side), and a Y-axis represents a vertical direction (a lower side is a positive side).

First, as shown in FIG. 11, the line data setter 53a of the grouping part 53 sets a one-dimensional line data L extending in the horizontal direction (X-axis direction), in a position of each feature point FP. The line data L is a line of dots (pixels) in a predetermined size having the feature point FP in a center. For example, the size of the line data L is "five" dots in FIG. 11. However, the size of the line data L is a changeable parameter (described later).

Next, the histogram generator 53b of the grouping part 53 generates a histogram HX that shows number of dots of the line data L in a vertical axis direction (Y-axis direction) as frequency. The histogram generator 53b generates the histogram HX referring to the dots of the line data L. The histogram HX has a horizontal axis showing position coordinates indicated by an X-axis and the vertical axis showing the number of dots. This histogram HX shows, as frequency, the number of dots of line data L existing in the vertical direction (Y-axis direction) on each coordinate position in the horizontal direction (X-axis direction).

Next, the range data deriving part 53c of the grouping part 53 derives horizontal range data LD that shows a range of the group in the horizontal direction (X-axis direction), based on a range in which the frequency in the histogram HX is equal to or greater than a threshold value (hereinafter referred to as "frequency threshold value"). An example of a threshold value Ta is "three" dots in FIG. 11. However, the frequency threshold value Ta is a changeable parameter (described later).

The range data deriving part 53c compares the frequencies of the histogram HX to the frequency threshold value Ta. Then, as shown in a bottom portion of FIG. 11, the range data deriving part 53c derives, as the horizontal range data LD, one-dimensional data showing a range in the horizontal direction (X-axis direction) in which the frequencies are equal to or greater than the frequency threshold value Ta. The horizontal range data LD shows the range in which the plurality of the feature points FP exist close to each other in the horizontal direction (X-axis direction) of the detection regions TA. The range data deriving part 53c may derive a plurality of the horizontal range data LD.

Next, the range data connector 53d of the grouping part 53 generates one set of horizontal range data LD by connecting the horizontal range data LD close to each other amongst the horizontal range data LD derived by the range data deriving part 53c. As shown in FIG. 12, the range data connector 53d looks at a distance Ph between two pieces of the horizontal range data LD that are next to each other. Then, in a case where the distance Ph is equal to or less than a threshold value (hereinafter referred to as "connection threshold value"), the range data connector 53d connects the two pieces of the horizontal range data LD as one piece of the horizontal range data LD. The connection threshold value is, for example, "two" dots in FIG. 12. However, the connection threshold value is a changeable parameter (described later).

There is a case where the horizontal range data LD of originally one object is derived as pieces of the horizontal range data LD because the horizontal range data LD is divided by a noise and the like. The range data connector 53d connects the divided pieces of the horizontal range data LD to appropriately derive the horizontal range data LD of the one object.

As described above, once deriving the horizontal range data LD, the grouping part 53 derives a vertical range data that is a range in the vertical direction (Y-axis direction) of the group. The grouping part 53 derives the vertical range data by the method that is used for deriving the horizontal range data LD but the grouping part 53 uses the Y-axis instead of the X-axis. However, as shown in FIG. 13, a range of the process target in the horizontal direction (X-axis direction) is limited to a range (X1 to X2) in which the horizontal range data LD exists.

Specifically, the line data setter 53a sets a one-dimensional line data extending in the vertical direction (Y-axis direction), in each position of feature points FP included in the range (X1 to X2) in which the horizontal range data LD exists. Then, the histogram generator 53b generates a histogram HY that shows number of dots of line data in a horizontal axis direction (X-axis direction) as frequency. Next, the range data deriving part 53c derives vertical range data MD based on a range in which the frequency in the histogram HY is equal to or greater than a frequency threshold value Tb. Next, the range data connector 53d connects the vertical range data MD close to each other as one piece of the vertical range data MD. The vertical range data MD is equivalent to a range in which the plurality of the feature points FP exist close to each other in the vertical direction (Y-axis direction) of the detection regions TA.

As described above, once the horizontal range data LD and the vertical range data MD are derived, the grouping part 53 sets a rectangle range TD, as shown in a lower drawing of FIG. 13, defined by the range (X1 to X2) in the horizontal direction (X-axis direction) shown by the horizontal range data LD and by the range (Y1 to Y2) in the vertical direction (Y-axis direction) shown by the vertical range data MD. Then, the grouping part 53 groups the plurality of the feature points FP included in the rectangle range TD as one group. A size of the rectangle range TD is the size of the group. There is a case where the grouping part 53 derives a plurality of the groups from one detection region TA.

4. CHANGE OF PARAMETERS

In a case where the object detection process using the optical flow method is used, while the host vehicle 9 is stopped, a relative position between background other than the moving object and the host vehicle 9 does not change. Therefore, optical flows of the background are not derived.

However, while the host vehicle 9 is travelling, the relative position between the background and the host vehicle 9 changes. Therefore, the optical flows of the background are derived. Normally, the optical flows of the background are excluded from the process targets because the optical flows of the background are outward optical flows.

However, there is a case where the optical flows of the background move inward under a certain circumstance. For example, while the host vehicle 9 is circling, there is a case where the optical flows of the background move inward. Moreover, there is a case where optical flows of a traffic sign, a compartment line (white line), etc. move inward due to false tacking of feature points and the like. Therefore, due to the optical flows of such a background, the background may be falsely detected as a moving object. In order to avoid such false detection of an object, it is recommended to decrease an object detection sensitivity while the host vehicle 9 is travelling.

The optical flows of the background are derived, as described above, while the host vehicle 9 is travelling. However, while the host vehicle 9 is stopped, the optical flows of the background are not derived. Therefore, while the host vehicle 9 is stopped, false detection caused by the optical flows of the background does not occur so that it is recommended to increase the object detection sensitivity.

Thus, the object detection apparatus 1 in this embodiment adjusts the object detection sensitivity according to the speed of the host vehicle 9. As the speed of the host vehicle 9 is slower, the object detection apparatus 1 increases the object detection sensitivity. More specifically, the object detection apparatus 1 relatively decreases the object detection sensitivity while the host vehicle 9 is travelling. However, the object detection apparatus 1 relatively increases the object detection sensitivity while the host vehicle 9 is stopped. Thus, while the host vehicle 9 is travelling, false detection of an object can be prevented. At the same time, while the host vehicle 9 is stopped, the object detection performance of the object detection apparatus 1 can be increased.

The object detection apparatus 1 in this embodiment sets the parameters that affect the size of the group derived by the grouping part 53, according to the speed of the host vehicle 9, to adjust the object detection sensitivity.

Figure 14:
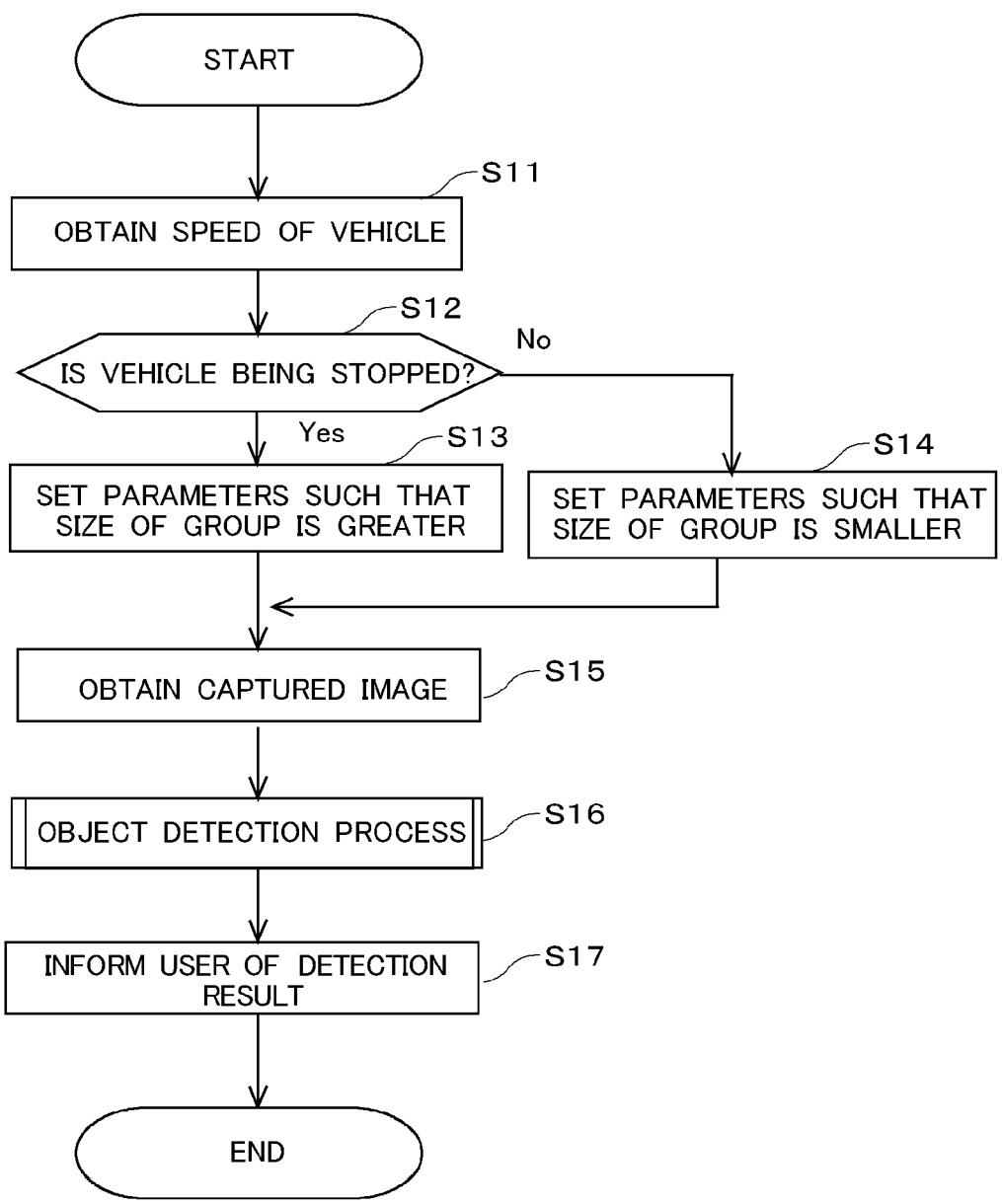
FIG. 14 illustrates a flow showing an operation of the object detection apparatus.

An operation of the object detection apparatus 1 will be described below. FIG. 14 illustrates a flow showing the operation of the object detection apparatus 1. A process shown in FIG. 14 is performed for each frame and is repeated in a predetermined time cycle (e.g., 1/30 sec. cycle).

First, the signal receiver 16 obtains the speed of the host vehicle 9 (a step S11). The signal receiver 16 obtains the speed of the host vehicle 9 by receiving the signal sent from the speed sensor 72.

Next, the stopped vehicle determination part 60 determines, based on the speed of the host vehicle 9 obtained by the signal receiver 16, whether or not the host vehicle 9 is stopped or is travelling (a step S12). In a case where the speed of the host vehicle 9 is less than a predetermined threshold value (e.g., 0.1 km/h), the stopped vehicle determination part 60 determines that the host vehicle 9 is stopped.

Next, the parameter setter 61 sets the parameters that affect the size of the group, based on a determination result determined by the stopped vehicle determination part 60. In a case where the host vehicle 9 is stopped, the parameter setter 61 sets the parameters such that the size of the group is greater as compared to a case where the host vehicle 9 is travelling. In other words, in the case where the host vehicle 9 is stopped (Yes in the step S12), the parameter setter 61 sets the parameters such that the size of the group is relatively greater (a step S13). On the other hand, in the case where the host vehicle 9 is travelling (No in the step S12), the parameter setter 61 sets the parameters such that the size of the group is relatively smaller (a step S14).

The parameter setter 61 sets the size of the line data, the frequency threshold value and the connection threshold value as the parameters that affect the size of the group. The parameters set by the parameter setter 61 are used for the object detection process (a step S16) performed afterward.

The parameter setter 61 sets the size of the line data, for example, to "five" dots in the case where the host vehicle 9 is stopped and to "three" dots in the case where the host vehicle 9 is travelling, respectively. As the size of the line data is greater, a distribution range in which the frequencies are distributed in the histogram HX is greater. Therefore, as compared to the case where the host vehicle 9 is travelling, in the case where the host vehicle 9 is stopped, the size of the group is greater.

Moreover, the parameter setter 61 sets the frequency threshold values Ta and Tb, for example, to "two" dots in the case where the host vehicle 9 is stopped and to "three" dots in the case where the host vehicle 9 is travelling, respectively. As the frequency threshold values Ta and Tb are smaller, the ranges indicated by the range data LD and MD are greater. Therefore, as compared to the case where the host vehicle 9 is travelling, in the case where the host vehicle 9 is stopped, the size of the group is greater.

Moreover, the parameter setter 61 sets the connection threshold value, for example, to "two" dots in the case where the host vehicle 9 is stopped and to "one" dot in the case where the host vehicle 9 is travelling, respectively. As the connection threshold value is greater, the range data LD and MD is more frequently connected to a next range data. Therefore, as compared to the case where the host vehicle 9 is travelling, in the case where the host vehicle 9 is stopped, the size of the group is greater.

In the process shown in FIG. 14, the parameter setter 61 sets the parameters in one of the steps S13 and S14. However, the parameter setter 61 may set the parameters only in a case where a state of the host vehicle 9 is changed from the state in which the host vehicle 9 is stopped to the state in which the host vehicle 9 is travelling, or vice versa.

Once the parameter setter 61 sets the parameters, the image obtaining part 12 obtains one captured image (frame) from one of the plurality of cameras 2 according to the operation mode, as a process target in the current object detection process (a step S15).

Next, the image processing circuit 13 performs the object detection process, using the captured image obtained by the image obtaining part 12 and the parameters set by the parameter setter 61 (a step S16). The flow of the object detection process is described above with reference to FIG. 9. The parameters set by the parameter setter 61 are used by the grouping part 53 in the process to group the feature points (the step S25).

Since the parameter setter 61 sets the parameters as described above, in the case where the host vehicle 9 is stopped, the size of the group is greater, as compared to the case where the host vehicle 9 is travelling. Therefore, in the case where the host vehicle 9 is stopped, an object is easily detected so that the object detection sensitivity increases. Thus, the object detection performance of the object detection apparatus 1 can be improved. On the other hand, in the case where the host vehicle 9 is travelling, it is difficult to detect an object so that the object detection sensitivity decreases. Thus, it is possible to prevent the background from being falsely detected as a moving object.

In a case where the image processing circuit 13 detects an object in the object detection process, the image processing circuit 13 outputs the detection result to the controller 11. Once receiving the detection result of the object detection process, the result informing part 62 of the controller 11 informs the user of the detection result (a step S17). The result informing part 62 causes the display image showing the detection result and the captured image, to be displayed on the display apparatus 3. Moreover, the result informing part 62 issues the warning sound corresponding to the detection result, from the speaker 4.

As described above, the flow derivation part 51 of the object detection apparatus 1 in this embodiment derives the optical flows based on the feature points of the captured images periodically obtained by the plurality of cameras 2 that capture images of the vicinity of the host vehicle 9. Then, the grouping part 53 derives a group by grouping the feature points relating to the optical flows based on the positions of the feature points. The object detector 54 detects an object based on the size of the group. Moreover, the signal receiver 16 obtains the speed of the host vehicle 9, and thus the parameter setter 61 sets the parameters that affect the size of the group, such that as the speed of the host vehicle 9 is lower, the size of the group is greater.

Therefore, as the speed of the host vehicle 9 is lower, the object detection sensitivity can be increased so that the object detection performance of the object detection apparatus 1 can be improved.

Moreover, the stopped vehicle determination part 60 determines whether or not the host vehicle 9 is stopped or is travelling, and the parameter setter 61 sets the parameters that affect the size of the group such that the size of the group is greater in the case where the host vehicle 9 is stopped, as compared to the case where the host vehicle 9 is travelling.

Therefore, while the host vehicle 9 is stopped, the object detection sensitivity of the object detection apparatus 1 is increased so that the object detection performance of the object detection apparatus 1 can be improved. On the other hand, while the host vehicle 9 is travelling, the object detection sensitivity of the object detection apparatus 1 is decreased so that it is possible to prevent false detection of an object.

5. MODIFICATIONS

The embodiment of the invention is described above. However, the invention is not limited to the foregoing embodiment, but various modifications are possible. Examples of those modifications will be described below. Any form of the embodiment described above and the modifications described below may be arbitrarily combined with one another.

In the foregoing embodiment, one of the front camera 2F and the rear camera 2B is used as the camera 2 that captures the image of the vicinity of the vehicle. However, another camera, such as a left side camera that captures images of an area on a left side of the vehicle and a right side camera that captures images of an area on a right side of the vehicle.

In the foregoing embodiment, the object detection apparatus 1 detects an object approaching the host vehicle 9. However, an object detection apparatus 1 may detect an object moving in a different direction other than the object approaching the host vehicle 9, such as an object moving away from the host vehicle 9.

In the foregoing embodiment, the parameter setter 61 sets the parameters at two levels, depending on whether the host vehicle 9 is stopped or is travelling. However, a parameter setter 61 may set the parameters at three or more levels, depending on a speed of a host vehicle 9. In this case, too, it is recommended that the parameter setter 61 should set the parameters such that as the speed of the host vehicle 9 is lower, a size of a group is greater.

In the foregoing embodiment, the function described as one block is not necessarily implemented by a single physical element, but may be implemented by separate physical elements. In the foregoing embodiment, the function described as a plurality of blocks may be implemented by a single physical element. Further, a process relating to one arbitrary function may be shared and implemented by apparatuses inside and outside the vehicle, and the function may be implemented as a whole by exchanging information via communications between those apparatuses.

Moreover, in the foregoing embodiment, all or any of the functions described to be implemented by software by executing programs may be implemented by electrical hardware circuit, and all or any of the functions described to be implemented by electrical hardware circuit may be implemented by software. Also, the function described as one block in the foregoing embodiment may be implemented by the cooperation of software and hardware.

For example, all or any of the process performed by the image processing circuit 13 in the foregoing embodiment may be performed by the controller 11. Contrarily, all or any of the process performed by the controller 11 in the foregoing embodiment may be performed by the image processing circuit 13.

While the invention has been shown and described in detail, the foregoing description is in all aspects illustrative and not restrictive. It is therefore understood that numerous other modifications and variations can be devised without departing from the scope of the invention.

What is claimed is:

1. An object detection apparatus that detects an object in surroundings of a vehicle, the object detection apparatus comprising:
   an image processing circuit configured to:
   (i) derive optical flows based on feature points of captured images periodically captured by a camera that captures images of the surroundings of the vehicle;
   (ii) group the feature points relating to the optical flows based on positions of the feature points to derive one or more groups; and
   (iii) detect the object based on a size of each of the one or more groups; and
   a microcomputer that communicates with the image processing circuit and is configured to:
   (a) obtain a speed of the vehicle; and
   (b) set a parameter that affects the size of the one or more groups such that as the speed of the vehicle is slower, the size of the one or more groups is greater.

2. The object detection apparatus according to claim 1, wherein the microcomputer is configured to:
   determine, based on the speed of the vehicle, whether the vehicle is stopped or is travelling, and
   set the parameter that affects the size of the one or more groups such that the size of the one or more groups is greater in a case where the vehicle is stopped, as compared to a case where the vehicle is travelling.

3. The object detection apparatus according to claim 1, wherein the image processing circuit groups the feature points by:
   setting one-dimensional line data extending in a first direction, in each position of the feature points relating to the optical flow;
   generating a histogram showing frequencies of dots of the line data in a second direction orthogonal to the first direction; and
   deriving range data showing a range of the one or more groups in the first direction based on a range of frequencies of the histogram, the frequencies being greater than a first threshold.

4. The object detection apparatus according to claim 3, wherein
   a size of the line data is one of the parameters set by the microcomputer.

5. The object detection apparatus according to claim 3, wherein
   the first threshold is one of the parameters set by the microcomputer.

6. The object detection apparatus according to claim 3, wherein
   the image processing circuit derives, as the range data, one-dimensional data showing the range of the frequencies of the histogram, the frequencies being greater than the first threshold; and in a case where a distance between two pieces of the range data next to each other is equal to or less than a second threshold, the image processing circuit connects the two pieces of the range data as one piece of the range data, wherein
   the second threshold is one of the parameters set by the microcomputer.

7. An object detection apparatus that detects an object in surroundings of a vehicle, the object detection apparatus comprising:
   a camera that captures images of the surroundings of the vehicle;
   an image processing circuit configured to:
   (i) derive optical flows based on feature points of the captured images periodically captured by the camera;
   (ii) group the feature points relating to the optical flows based on positions of the feature points to derive one or more groups; and
   (iii) detect the object based on a size of each of the one or more groups; and
   a microcomputer that communicates with the image processing circuit and is configured to:
   (a) obtain a speed of the vehicle; and (b) set a parameter that affects the size of the one or more groups such that as the speed of the vehicle is slower, the size of the one or more groups is greater.

8. An object detection method of detecting an object in surroundings of a vehicle, the object detection method comprising the steps of:
   (a) deriving, with an image processing circuit, optical flows based on feature points of captured images periodically captured by a camera that captures images of the surroundings of the vehicle;
   (b) grouping, with the image processing circuit, the feature points relating to the optical flows based on positions of the feature points to derive one or more groups;
   (c) detecting, with the image processing circuit, the object based on a size of the one or more groups;
   (d) obtaining, with a microcomputer, a speed of the vehicle; and
   (e) setting, with the microcomputer, a parameter used by the image processing circuit and that affects the size of the one or more groups such that as the speed of the vehicle is slower, the size of the one or more groups is greater.

9. The object detection method according to claim 8, wherein:
   step (d) includes determining, based on the speed of the vehicle, whether the vehicle is stopped or is travelling, and
   step (e) includes setting the parameter that affects the size of the one or more groups such that the size of the one or more groups is greater in a case where the vehicle is stopped, as compared to a case where the vehicle is travelling.

10. The object detection method according to claim 8, wherein step (b) includes:
    setting one-dimensional line data extending in a first direction, in each position of the feature points relating to the optical flow;
    generating a histogram showing frequencies of dots of the line data in a second direction orthogonal to the first direction; and
    deriving range data showing a range of the one or more groups in the first direction based on a range of frequencies of the histogram, the frequencies being greater than a first threshold.

11. The object detection method according to claim 10, wherein
    a size of the line data is one of the parameters set by the microcomputer.

12. The object detection method according to claim 10, wherein
    the first threshold is one of the parameters set by the microcomputer.

13. The object detection method according to claim 10, wherein
    the image processing circuit derives, as the range data, one-dimensional data showing the range of the frequencies of the histogram, the frequencies being greater than the first threshold; and in a case where a distance between two pieces of the range data next to each other is equal to or less than a second threshold, the image processing circuit connects the two pieces of the range data as one piece of the range data, and
    the second threshold is one of the parameters set by the microcomputer.

14. A non-transitory computer-readable recording medium that stores a program to be executed by a computer used in a vehicle, the program causing the computer to execute the steps of:
    (a) deriving optical flows based on feature points of captured images periodically captured by a camera that captures images of the surroundings of the vehicle;
    (b) grouping the feature points relating to the optical flows based on positions of the feature points to derive one or more groups;
    (c) detecting the object based on a size of the one or more groups;
    (d) obtaining a speed of the vehicle; and
    (e) setting a parameter that affects the size of the one or more groups such that as the speed of the vehicle is slower, the size of the one or more groups is greater.

* * * * *